(12) United States Patent
Achkir (10) Patent No.: US 10,914,894 B2
(45) Date of Patent: Feb. 9, 2021

(54) PHOTONIC WAVEGUIDE FORMED FROM CORE MATERIAL WITH TUNED INDEX OF REFRACTION

(71) Applicant: CISCO TECHNOLOGY, INC., San Jose, CA (US)

(72) Inventor: D. Brice Achkir, Livermore, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/574,884

(22) Filed: Sep. 18, 2019

(65) Prior Publication Data

US 2020/0057193 A1 Feb. 20, 2020

Related U.S. Application Data

(63) Continuation of application No. 16/103,901, filed on Aug. 14, 2018, now Pat. No. 10,459,161.

(51) Int. Cl.
*G02B 6/122* (2006.01)
*G02B 6/13* (2006.01)
*G02B 6/12* (2006.01)

(52) U.S. Cl.
CPC .............. *G02B 6/122* (2013.01); *G02B 6/13* (2013.01); *G02B 2006/12069* (2013.01); *G02B 2006/12088* (2013.01)

(58) Field of Classification Search
CPC ............ G02B 6/122; G02B 6/13; G02B 2006/12088; G02B 2006/12069
See application file for complete search history.

(56) References Cited

U.S. PATENT DOCUMENTS

| 4,346,961 | A | 8/1982 | Porter |
| 5,369,719 | A | 11/1994 | Mishima |
| 5,600,745 | A | 2/1997 | Wuu |
| 5,710,854 | A | 1/1998 | Myers |
| 6,671,438 | B2 | 12/2003 | Ido |
| 7,224,870 | B2 | 5/2007 | Margalit |
| 7,561,761 | B2 | 7/2009 | Sigalas |
| 8,542,961 | B2 | 9/2013 | Kuo |
| 8,937,024 | B2 * | 1/2015 | Bergmann ........ H01L 27/14601 438/799 |
| 8,938,148 | B2 | 1/2015 | Achkir |
| 9,658,397 | B1 | 5/2017 | Achkir |
| 2006/0159411 | A1 | 7/2006 | Miller |
| 2008/0138015 | A1 | 6/2008 | Song |

(Continued)

FOREIGN PATENT DOCUMENTS

KR 20050023178 A 3/2005

OTHER PUBLICATIONS

Roger Angel et al., "Polymer waveguides for electro-optical integration in data centers and high-performance computers", Optical Society of America, Feb. 23, 2015, vol. 23, No. 4.

(Continued)

*Primary Examiner* — John Bedtelyon
(74) *Attorney, Agent, or Firm* — Cindy Kaplan (57) ABSTRACT

In one embodiment, a photonic waveguide comprises a layer of core material and a waveguide core extending through the core material. The core material surrounding the waveguide core is modified to simulate clad material. A method for forming the photonic waveguide is also disclosed herein.

18 Claims, 7 Drawing Sheets

(56) References Cited

U.S. PATENT DOCUMENTS

2013/0243383 A1  9/2013  Agarwal
2015/0293299 A1  10/2015 Xu

OTHER PUBLICATIONS

J. V. Galan et al., "Low-loss coupling technique between SOI waveguides and standard single-mode fibers", www.-ecio-conference.org, Aug. 24, 2018.

* cited by examiner

PHOTONIC WAVEGUIDE FORMED FROM CORE MATERIAL WITH TUNED INDEX OF REFRACTION

STATEMENT OF RELATED APPLICATION

The present application is a continuation of U.S. patent application Ser. No. 16/103,901, entitled PHOTONIC WAVEGUIDE FORMED FROM CORE MATERIAL WITH TUNED INDEX OF REFRACTION, filed Aug. 14, 2018. The content of this application is incorporated herein by reference in its entirety.

TECHNICAL FIELD

The present disclosure relates generally to optical components, and more particularly, to photonic waveguides.

BACKGROUND

Optical link technology is being increasingly integrated into high speed systems to provide advantages in bandwidth and power efficiency as compared with electrical interconnects. At the printed circuit board (PCB) level, waveguide technology is being integrated to carry large amounts of data at higher speeds, while attempting to solve signal integrity issues associated with copper.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a photonic waveguide generally comprises a layer of core material and a waveguide core extending through the core material. The core material surrounding the waveguide core is modified to simulate clad material.

In another embodiment, a method generally comprises defining a waveguide core in a layer of core material and modifying the core material surrounding the waveguide core to simulate clad material to form a photonic waveguide.

In yet another embodiment, an apparatus comprises a photonic waveguide defining an optical interconnect. The photonic waveguide generally comprises a layer of core material and a waveguide core extending through the core material. The core material surrounding the waveguide core is modified to simulate clad material.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Photonic waveguides (optical waveguides, polymer waveguides (PWGs)) are increasingly being used to address limitations of the use of copper as interconnects in electronic components. Photonic waveguides may be used, for example, to distribute optical signals, similar to the function of copper traces and vias in high density electrical laminates, and form the interface between a silicon photonics chips and a fiber cable. Copper traces may be replaced with photonic waveguides at various levels, including for example, chip, printed circuit board (PCB), and backplane. Photonic waveguides provide high bandwidth, low integration cost, similarity in fabrication processes with laminates and allow for use of the same routing tools.

One limitation of polymer waveguides is their high loss (optical transmission (performance) loss (dB/cm)) as compared with glass fiber. Recent developments in polymer waveguide material have led to a reduction in loss, and the loss is expected to be further reduced with new and emerging materials. This has led to consideration of polymer waveguides for short interconnects.

Although the process of building polymer waveguides is similar and compatible with printed circuit boards, it has a few limitations that impact the cost and quality, including for example, the number of steps involved in the manufacturing process. Also, the tolerances due to a mask alignment process for sequential buildup of the waveguide may not be adequate for single mode applications or allow for coupling with a single mode fiber.

The embodiments described herein overcome one or more of the drawbacks described above for photonic waveguides. As described in detail below, a core material tuning technique may be used to allow for the building of waveguides in any media and for any type of optical interconnect. In one or more embodiments, the core material index of refraction is changed while preserving optical properties. For example, the index of refraction of the core material may be modified (tuned) to produce an effective index of refraction of the waveguide that is similar to a waveguide with only clad material surrounding the waveguide core. As described below, simulations may be performed to identify how to modify the core material so that the effective refractive index of the waveguide is approximately the same as the effective refractive index of the waveguide with a core surrounded with clad material. This allows for a single mode waveguide with a larger core size that corresponds to an optical fiber. One or more embodiments may also provide cost reduction by reducing the number of steps needed in a manufacturing process to produce the waveguide.

The photonic waveguides described herein may be polymer waveguides or waveguides fabricated with other suitable material including, for example, glass sheets. For simplification, the description herein focuses on polymer waveguides, but the same concepts may be applied to other types of photonic waveguides. The embodiments described herein may be used for single mode and multimode waveguides and for any wavelength space. For simplification, the following examples describe single mode waveguides, but it is to be understood that this is only an example and the embodiments described herein may also be used for multimode waveguides.

In order to build conventional polymer waveguides, two materials are needed, one for the clad (cladding layer) and the other for the core (core layer). The embodiments described herein tune the core material used to form the waveguide to simulate (mimic) the clad material that typically surrounds the core of the waveguide, which allows the waveguide core to be formed such that it is surrounded at least in part by modified (tuned) core material.

Figure 1:
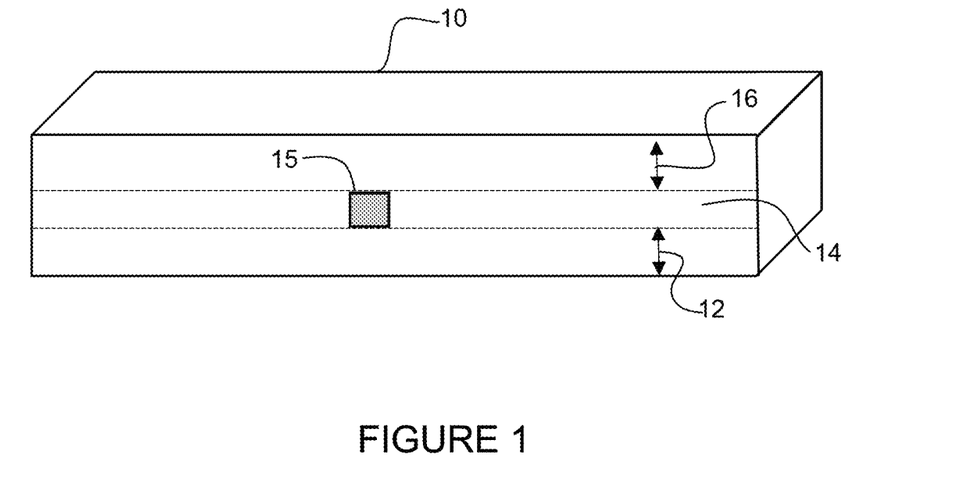
FIG. 1 is a perspective of a photonic waveguide, in accordance with one embodiment.

Referring now to the drawings, and first to FIG. 1, an example of a single mode photonic waveguide 10 is shown. The photonic waveguide 10 includes a lower portion (layer) 12, a core portion (layer) 14, and an upper portion (layer) 16 (lower and upper portions indicated by arrows and dashed lines in FIG. 1 with the core portion interposed therebetween). A waveguide core 15 extends through the core material (core layer) 14 (i.e., partially therethrough or from front face to back face). In one example, the waveguide core 15 is a ten micron square (10 µm×10 µm) and the core layer 14 (10 µm thick layer) is interposed between a lower cladding layer 12 (80 µm thick) and an upper cladding layer 16 (80 µm thick) (as described below with respect to FIG. 2C). In another example, the photonic waveguide is formed in a core material block (element) having a thickness of 170 µm (corresponding to 80 µm thick lower portion 12+10 µm thick core portion 14+80 µm thick upper portion 16 formed as one element) with a 10 µm square waveguide core 15 (as described below with respect to FIG. 4B). Thus, in one or more embodiments, the lower portion 12, core portion 14, and upper portion 16 may be defined by individual layers of material (FIG. 2C), while in one or more other embodiments, these portions define a block of core material (FIG. 4B). It is to be understood that the dimensions described herein are only examples and other dimensions or waveguide core shapes or sizes may be used without departing from the scope of the embodiments. Also, as noted above, the waveguide may be multimode and is not limited to polymer material.

As described in detail below, the core material surrounding the waveguide core 15 (e.g., core layer 14 adjacent to the waveguide core (FIGS. 1 and 2C) or lower, core, and upper portions 12, 14, 16 of core material located below the waveguide core, adjacent to the waveguide core, and above the waveguide core (FIGS. 1 and 4B)) is modified to simulate clad material. For example, the core material surrounding the waveguide core 15 may be modified by inserting air (creating holes) or injecting another material (e.g., by using a mosquito technique to form the holes) with a lower index of refraction than the core material to reduce the index of refraction of the core material surrounding the waveguide core 15 so that it is the same (e.g., generally the same or close) to the index of refraction of the clad material. More specifically, the core material surrounding the waveguide core 15 is tuned such that the photonic waveguide has approximately the same effective refractive index as a photonic waveguide with the core 15 surrounded by only clad material.

In the following example, the number of steps described in building the waveguide is limited to two or three for simplification. It is to be understood that variations may be used in the process or processing steps may be added, without departing from the scope of the embodiments.

Figure 2A:
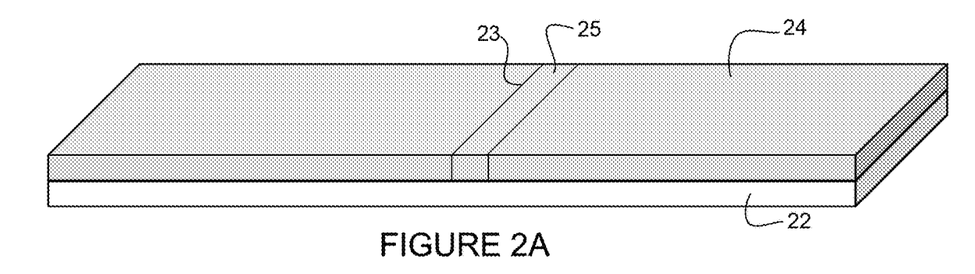
FIG. 2A illustrates a first step in a process for forming the photonic waveguide, in accordance with one embodiment.
Figure 2B:
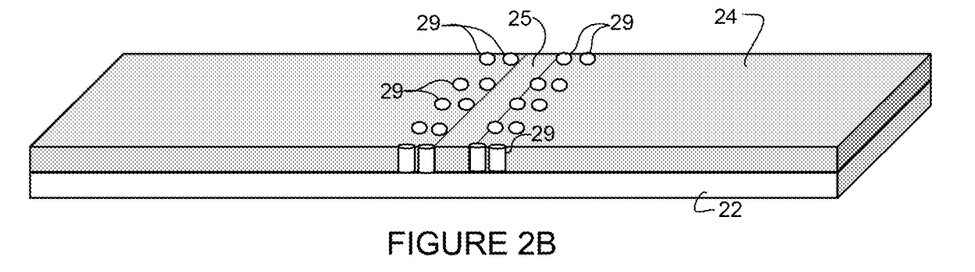
FIG. 2B illustrates a second step in the process for forming the photonic waveguide.
Figure 2C:
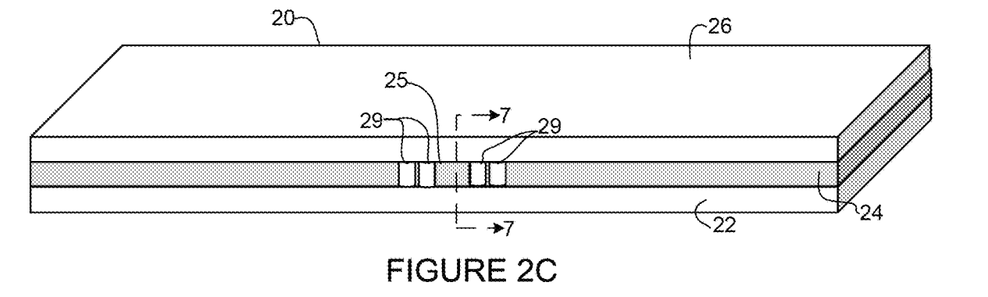
FIG. 2C illustrates a third step in the process for forming the photonic waveguide.

FIGS. 2A-2C illustrate steps in the process of forming a photonic waveguide 20, in accordance with one embodiment. In this example, the process starts with an 80 µm cladding layer 22. A 10 µm core layer 24 is deposited onto the cladding layer 22. The future location of the waveguide core 25 is defined as indicated by boundary lines 23 defining the waveguide core shape in FIG. 2A. In FIG. 2A, the location where the waveguide core will be located after the core material is modified is shown. In the area surrounding the location of the waveguide core 25, cylindrical holes 29 are drilled in the core material 24 (FIG. 2B). These holes 29 may be drilled similar to techniques used to drill vias in a PCB or any other suitable technique may be used, including chemical based processes. Selection of the size of the holes 29, number of holes, and spacing between the holes is described below. After the holes 29 are formed, they can be filled with material that has an index close to air or left as is since the next step will not impact the holes due to the clad viscosity. The upper cladding layer 26 is then disposed on the core layer 24 and the waveguide is formed. In the above described example, there is no need for a chemical process to form the core 25 of the waveguide 20.

It is to be understood that the cylindrical shape of the holes 29, size of the holes, and spacing of the holes shown in FIG. 2B is only an example and that variations may be made, without departing from the scope of the embodiments. Also, rather than creating holes in the core material 24, a material with a refractive index lower than the refractive index of the core material may be injected into the core material to change the effective refractive index of the waveguide.

Figure 3:
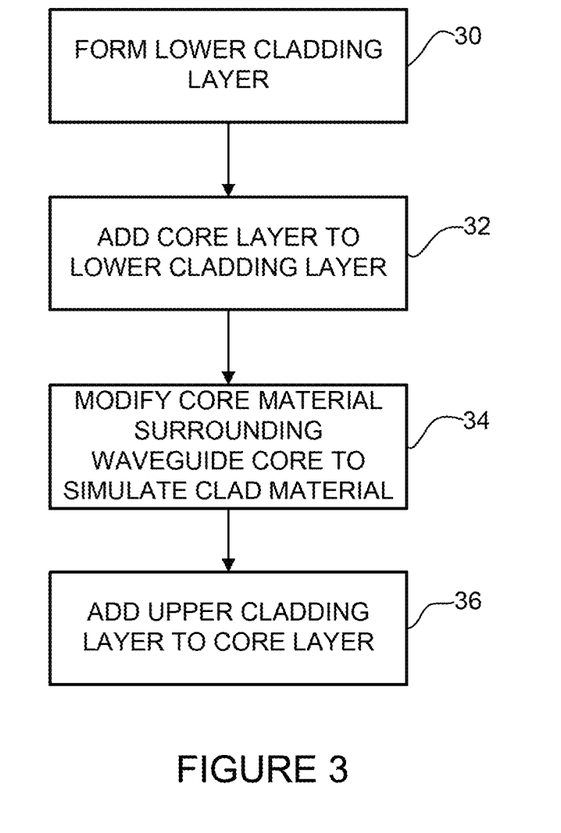
FIG. 3 is a flowchart illustrating an overview of the process for forming the photonic waveguide shown in FIG. 2C.

FIG. 3 is a flowchart illustrating an overview of a process for forming the waveguide 20 shown in FIG. 2C. A lower cladding layer 22 is formed at step 30 (FIGS. 2A and 3). The core layer 24 is added to the lower cladding layer 22 (step 32). The core material 24 surrounding the location of the waveguide core 25 is then modified to simulate the clad material (cladding layer) (step 34) (FIGS. 2B and 3). The core material may be modified by drilling holes (cylindrical or other shapes) or injecting a material (e.g., using a mosquito injection process or other suitable process) with a different index of refraction to provide a new effective refractive index for the waveguide. The upper cladding layer 26 may then be added to the core layer 24 using any suitable process (step 36) (FIGS. 2C and 3).

It is to be understood that the process shown in FIG. 3 is only an example and that steps may be added, removed, combined, or modified, without departing from the scope of the embodiments.

Figure 4A:
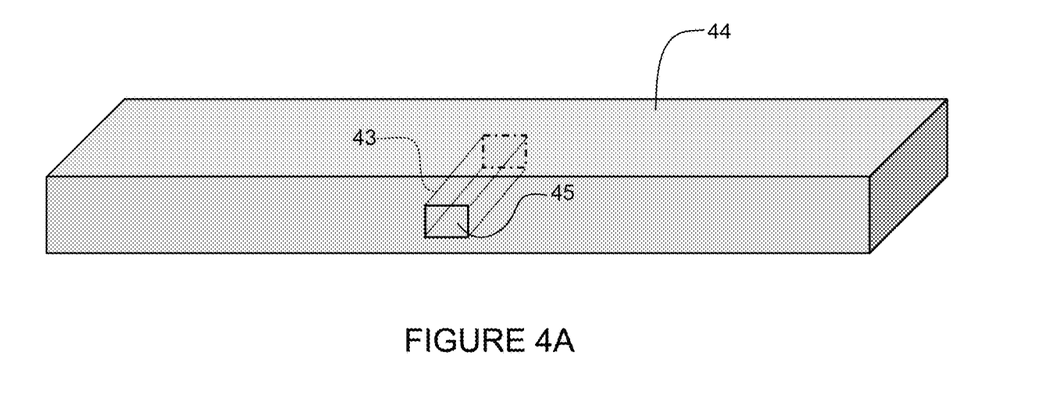
FIG. 4A illustrates a virtual location of a waveguide core in a core material element for use in forming the photonic waveguide, in accordance with another embodiment.
Figure 4B:
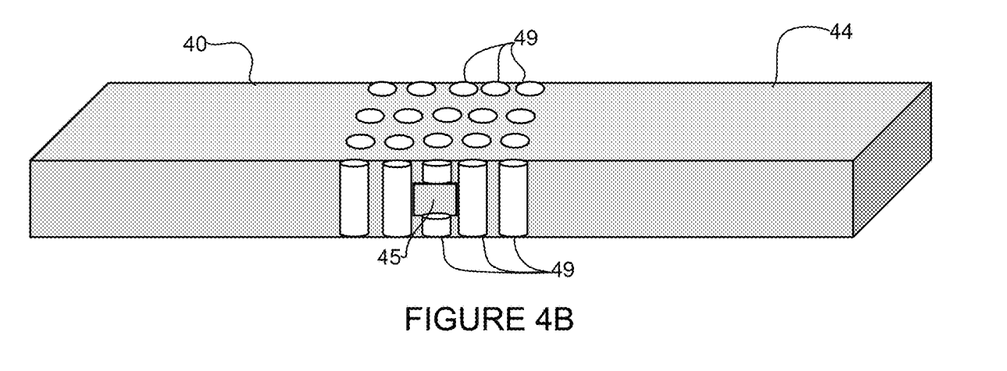
FIG. 4B illustrates a second step in the process for forming the photonic waveguide.

FIGS. 4A and 4B illustrate a process for forming a photonic waveguide 40, in accordance with another embodiment. In this example, the process starts with a 170 µm thick layer of core material 44 (e.g., 80 µm (lower portion)+10 µm (core portion)+80 µm (upper portion)). A 10 µm waveguide core 45 will be located inside the core material block 44 as indicated by boundaries 43 in FIG. 4A. Thus, the lines 43 in FIG. 4A show where the waveguide core 45 will be located after the core material is modified as shown in FIG. 4B. Cylindrical holes 49 are drilled into the core material surrounding the waveguide core 45 to provide the desired geometry. The holes 49 are drilled from the top to the bottom on each side of the core 45 and from the top to the waveguide core interface and from the bottom to the waveguide core interface, so that the entire waveguide core is surrounded on all sides by the modified core material. The modified core material surrounding the waveguide core 45 simulates clad material, as previously described. In one example, holes may be formed using a mosquito technique, as previously noted.

Figure 5:
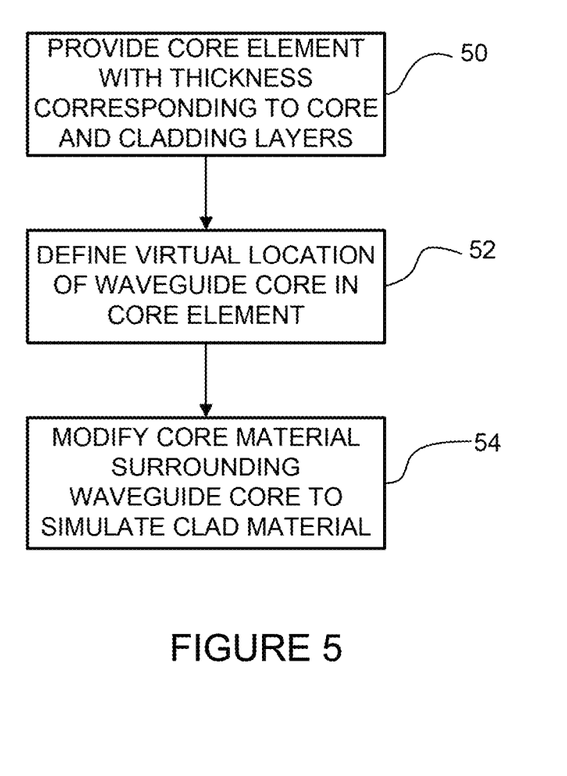
FIG. 5 is a flowchart illustrating an overview of the process for forming the photonic waveguide shown in FIG. 4B.

FIG. 5 is a flowchart illustrating an overview of a process for forming the photonic waveguide 40 shown in FIG. 4B. A core element (block) comprising core material is provided with a thickness corresponding to desired core layer and cladding layers (e.g., total desired thickness) (step 50). As described above, the cladding layers are replaced by core material. The waveguide geometry (boundary) is defined in the core element to provide a virtual location of the waveguide core (step 52). The material surrounding the waveguide core is modified to simulate the clad material (step 54). Air cylinders may be formed in the core material as described above with respect to FIG. 4B, or the material may be injected with another material to provide an effective refractive index corresponding to the effective refractive index of a waveguide formed with clad material.

It is to be understood that the process shown in FIG. 5 is only an example and that steps may be added, removed, combined, or modified, without departing from the scope of the embodiments.

The following describes an example of a process for determining how to modify the core material to simulate clad material. In this example, air cylinders are added to the core material adjacent to (on both sides of) the waveguide core as shown in FIGS. 2B and 2C to achieve a clad index of refraction in the core material. In the following example, a process is described for determining what percentage air is needed to convert the core material on each side of the waveguide core such that it will have generally the same refractive index as the lower and upper cladding layers.

In this example, core material is tuned for a polymer waveguide with a 10 µm square core size with index of refraction $n_1$=1.535 (core) and $n_2$=1.519 (clad) to have characteristics that will allow for coupling with a glass fiber with about a 10 µm core size in guiding optical signal. In order to achieve this, air is introduced into the clad ($n_{air}$=1). A Lumerical Mode Solution design tool was used in this example. First, the effective index for the square waveguide (10 µm×10 µm) with a core index $n_1$=1.535 and clad index $n_2$=1.519 was found to be 1.532385. Air cylinders were added into the model to find the percentage of air needed to obtain the same effective index. Next, the air percentage was identified so that the core material with air cylinders surrounding the core of the waveguide will provide the same effective index of refraction as the waveguide formed with clad material.

The key parameters are the cylinder radius and the spacing between the cylinders. In this example, an Eigenmode Solver simulation was used and the cylinder radius was varied from 10 to 100 nanometers (nm) with two micron spacing between the cylinders. The 2 µm spacing was identified in a previous modeling. Air percentage is defined as the air cylinder area divided by the total core material area with air cylinders. For this example:

Air percentage=2×air cylinder radius/spacing=air cylinder radius/1 µm

Table I below shows the results for a model in which the air cylinder radius was varied from 10 nm to 100 nm with the resulting air percentage and the new effective refractive index included.

TABLE I

| Air Cylinder Radius (nm) | Air Percentage (%) | Effective Refractive Index |
|---|---|---|
| 10 | 1 | 1.53261 |
| 20 | 2 | 1.532496 |
| 30 | 3 | 1.532445 |
| 40 | 4 | 1.532416 |
| 50 | 5 | 1.532395 |
| 60 | 6 | 1.53238 |
| 70 | 7 | 1.532368 |
| 80 | 8 | 1.532358 |
| 90 | 9 | 1.53235 |
| 100 | 10 | 1.532342 |

Figure 6:
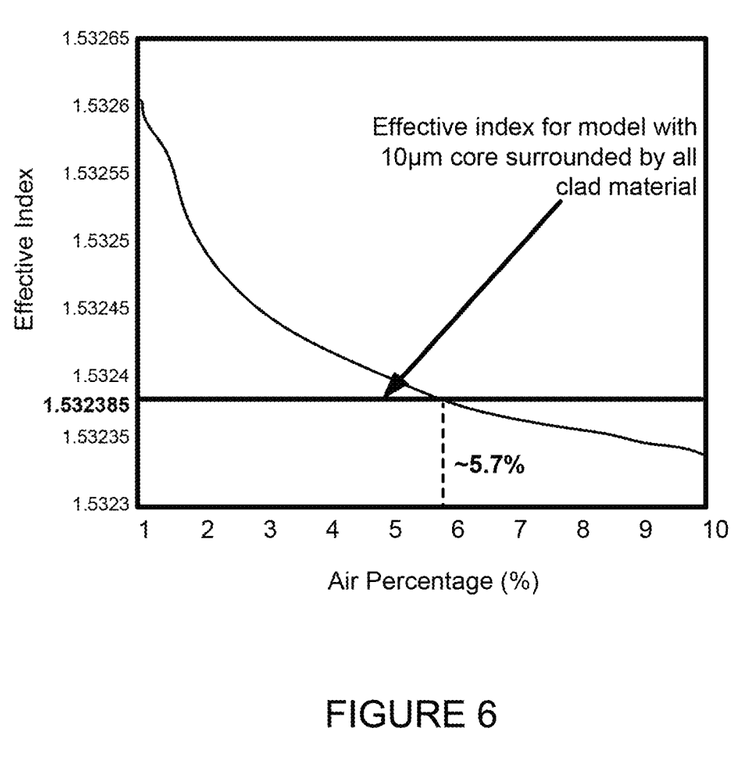
FIG. 6 is an example of a plot of effective index as a function of air percentage for use in determining the percentage of air needed to tune core material of the photonic waveguide to simulate clad material.

FIG. 6 is a plot of the effective index as a function of air percentage. From this plot the percentage of air needed is identified as 5.7%, which corresponds to an effective index of 1.532385 (the effective refractive index for the actual module with 10 µm core surrounded by all clad material) and the corresponding radius of the air cylinders can be identified from Table I. The mode field diameter may also be modeled to verify the calculations, as is well known by those skilled in the art.

A similar modeling process may be used to determine the percentage of air needed and corresponding radius of air cylinders in the core material surrounding the waveguide core for the photonic waveguide 40 shown in FIG. 4B.

Figure 7:
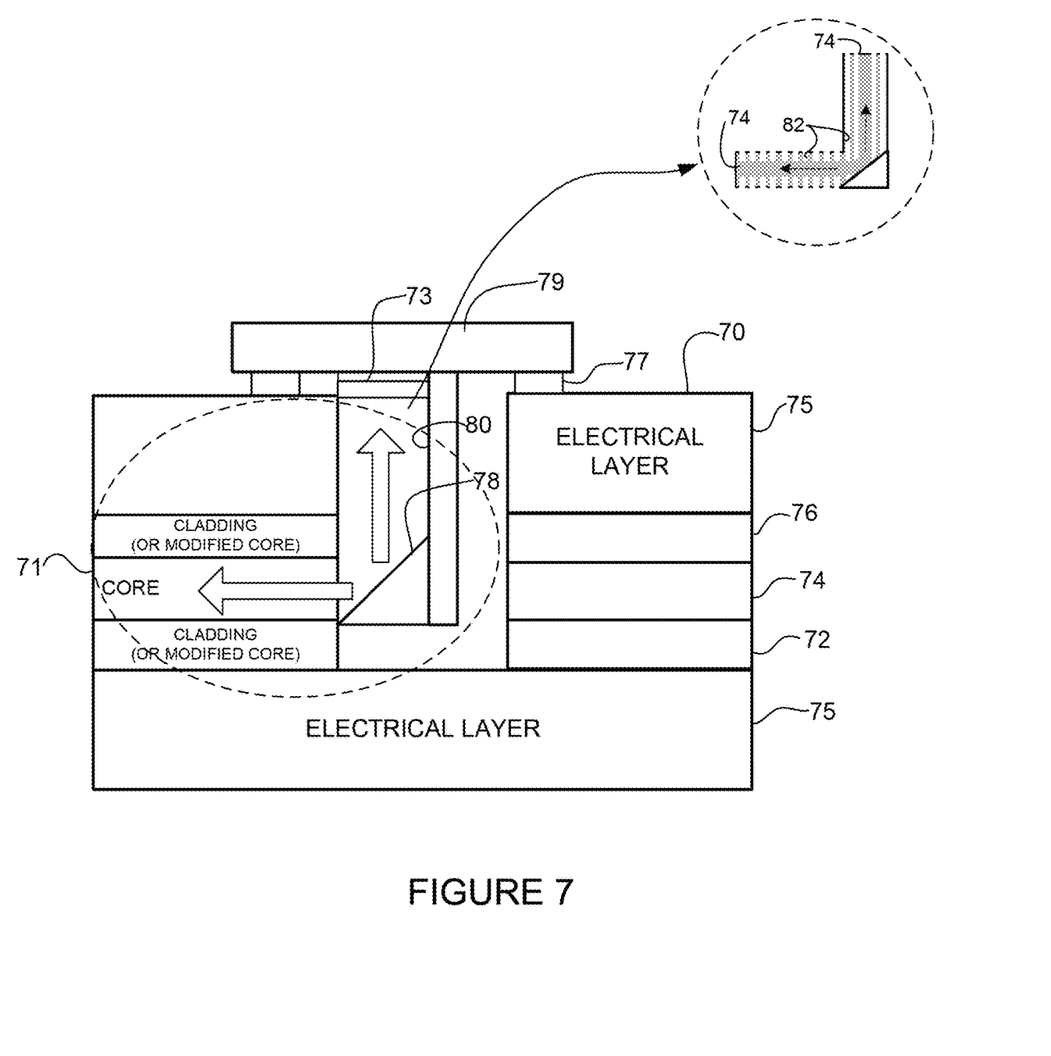
FIG. 7 illustrates an example of the photonic waveguide integrated with an optical transmitter or receiver.

The photonic waveguides described herein may be easily integrated with other photonic components for many different implementations or applications. In one example, the photonic waveguide described herein may be integrated with a multi-chip module with an array of VCSELs (Vertical Cavity Surface Emitting Lasers). FIG. 7 shows an example of a portion of a PCB 70 comprising a photonic waveguide 71 (e.g., cross-section as viewed through line 7-7 in FIG. 2C) integrated with an optical transmitter (VCSEL) or receiver (photodiode) 73. Light is reflected off of reflective surface 78. The waveguide (core layer 74 and cladding layers 72, 76 (or modified core material as shown in FIG. 4B)) are interposed between electrical layers 75 with a chip (e.g., ASIC (Application Specific Integrated Circuit)) 79 in contact with the upper electrical layer via electrical contacts 77. It is to be understood that FIG. 7 is only an example illustrating one possible implementation of the photonic waveguide. The photonic waveguide described herein may be used, for example, in integrating single mode silicon photonic components into a chip, PCB, or backplane.

In the example shown in FIG. 7, a vertical waveguide 80 may be formed using any suitable method. In one example, both the horizontal waveguide 71 and the vertical waveguide 80 may be formed using the embodiments described herein to form an L-shaped photonic waveguide formed from core material with a tuned index of refraction, as shown in the cutout view in FIG. 7. The modified core material surrounding the core 74 may include openings 82, as described above with respect to FIG. 4B. As previously described, the core material may be modified so that the effective refractive index of the waveguide is approximately the same as the effective refractive index of a waveguide with a core surrounded with clad material. The waveguide may be formed from a layer of core material disposed between cladding layers (as shown in FIG. 2C) or from a core material block as shown in FIG. 4B (and cutout view in FIG. 7).

The photonic waveguide may be configured for operation in any type of network device (e.g., router, switch, gateway, controller, edge device, access device, aggregation device, core node, intermediate node, or other network device). The network device may operate in the context of a data communications network including multiple network devices. The network device may communicate over one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet, intranet, radio access network, public switched network, or any other network).

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A photonic waveguide comprising:
a layer of core material; and
a waveguide core extending through the core material;
wherein the core material adjacent to the waveguide core is modified to simulate clad material and wherein the layer of core material is interposed between a lower cladding layer and an upper cladding layer comprising said clad material.

2. The photonic waveguide of claim 1 wherein the core material adjacent to the waveguide core comprises an area injected with a material comprising a different index of refraction than an index of refraction of the core material to reduce the index of refraction of the core material, wherein the material is injected from an upper surface or a lower surface of the layer of core material.

3. The photonic waveguide of claim 1 wherein the photonic waveguide defines an optical interconnect.

4. The photonic waveguide of claim 1 wherein the photonic waveguide is formed from glass sheets.

5. A photonic waveguide comprising:
a layer of core material; and
a waveguide core extending through the core material from a first edge to a second edge;
wherein the core material surrounding a length of the waveguide core comprises a plurality of openings to change an index of refraction of the core material and define the waveguide core, and wherein at least a portion of said plurality of openings extend from an upper surface of the core material to a lower surface of the core material and wherein said plurality of openings do not extend into the waveguide core.

6. The photonic waveguide of claim 5 further comprising two layers of clad material, wherein the layer of core material is disposed between the two layers of clad material and wherein said index of refraction of the core material surrounding the length of the waveguide core generally corresponds to an index of refraction of the clad material.

7. The photonic waveguide of claim 5 wherein said openings are located adjacent to, below, and above the waveguide core.

8. The photonic waveguide of claim 5 wherein the photonic waveguide defines an optical interconnect.

9. The photonic waveguide of claim 5 wherein the photonic waveguide is integrated with another photonic component.

10. A method comprising:
defining a location for a waveguide core in a layer of core material; and
modifying the core material surrounding said location for the waveguide core without modifying the core material in said location for the waveguide core to simulate clad material and form the waveguide core;
wherein modifying the core material comprises creating openings in the core material, at least a portion of said openings extending from an upper surface of the core material to a lower surface of the core material.

11. The method of claim 10 further comprising
forming a lower cladding layer;
adding the layer of core material to the lower cladding layer; and
adding an upper cladding layer to the layer of core material after forming the waveguide core.

12. The method of claim 10 wherein modifying the core material surrounding the waveguide core comprises creating openings in the core material.

13. The method of claim 10 wherein modifying the core material surrounding the waveguide core comprises inserting a material with an index of refraction different than an index of refraction of the core material into the core material surrounding the waveguide core.

14. The method of claim 10 wherein the core material surrounding the waveguide core is modified such that an effective refractive index of a photonic waveguide defined by the cladding layers and the core material corresponds to the effective refractive index of the waveguide core surrounded by the clad material.

15. The method of claim 10 wherein modifying the core material comprises creating a plurality of openings adjacent to, below, and above said location for the waveguide core.

16. The method of claim 10 wherein the layer of core material comprises a core element with thickness corresponding to core and cladding layers and wherein modifying the core material surrounding said location for the waveguide core comprises modifying the core material adjacent to, below, and above said location for the waveguide core.

17. The method of claim 10 wherein the layer of core material comprises glass sheets.

18. The method of claim 10 wherein the layer of core material comprises a polymer material.

* * * * *